United States Patent
Fisk

(10) Patent No.: US 9,465,109 B2
(45) Date of Patent: Oct. 11, 2016

(54) LASER PROJECTED ACOUSTIC SENSOR APPARATUS AND METHOD

(71) Applicant: LOCKHEED MARTIN CORPORATION, Bethesda, MD (US)

(72) Inventor: Bryan N. Fisk, Liverpool, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 710 days.

(21) Appl. No.: 13/691,431

(22) Filed: Nov. 30, 2012

(65) Prior Publication Data

US 2015/0226708 A1    Aug. 13, 2015

Related U.S. Application Data

(60) Provisional application No. 61/565,610, filed on Dec. 1, 2011.

(51) Int. Cl.
  *G01S 15/42*    (2006.01)
  *G01S 7/54*     (2006.01)
  *G01S 7/52*     (2006.01)
  *G01S 7/526*    (2006.01)
  *G01S 7/539*    (2006.01)

(52) U.S. Cl.
  CPC ............ *G01S 15/42* (2013.01); *G01S 7/52003* (2013.01); *G01S 7/526* (2013.01); *G01S 7/539* (2013.01); *G01S 7/54* (2013.01)

(58) Field of Classification Search
  CPC ........ F41H 13/00; G01S 17/42; G01S 7/481; G01S 17/87; G01C 3/08
  USPC ............ 356/3.01–3.15, 4.01–4.1, 5.01–5.15, 356/6–22, 28, 28.5
  See application file for complete search history.

(56) References Cited

U.S. PATENT DOCUMENTS 6,392,747 B1 * 5/2002 Allen et al. ................ 356/141.1
2011/0310220 A1 * 12/2011 McEldowney ................ 348/42

* cited by examiner

*Primary Examiner* — Luke Ratcliffe
(74) *Attorney, Agent, or Firm* — Hamre, Schumann, Mueller & Larson, P.C.

(57) ABSTRACT

A plurality of lasers produces a lattice of projected points. A sensor system detects movement in the projected points in response to an incoming wave.

22 Claims, 8 Drawing Sheets

LASER PROJECTED ACOUSTIC SENSOR APPARATUS AND METHOD

RELATED APPLICATION

This application claims the benefit of U.S. Provisional Patent Application Ser. No. 61/565,610, filed on Dec. 1, 2011, which is incorporated by reference herein.

TECHNICAL FIELD

Various embodiments described herein relate to a system and a method for forming a laser projected acoustic sensor apparatus that senses various wavefront characteristics, including, but not limited to, shape and frequency, before the wavefront encounters the laser projecting vessel. The sensed wavefront characteristics are used to determine phase adjustments at the acoustic sensor which are about to receive the signal, or may replace traditional acoustic sensors altogether. In one embodiment, the sensors are used on vessels, such as a submarine, as part of a Sonar system.

BACKGROUND

Sonar is a well known apparatus having both civilian and military applications. Sonar (originally an acronym for SOund Navigation And Ranging) is a technique that uses sound propagation, usually underwater, to navigate, communicate with or detect other vessels. Sonar uses sensors placed in arrays to receive sound. The arrays can be deployed in many ways. Some sonar arrays are towed behind a ship or submarine. Towing an array of sensors or hydrophones presents many problems. Amongst the problems are keeping the tow lines straight during vessel maneuvers. Another way to deploy an array is by mounting sensors to the hull of a ship, such as a submarine. Hull mounted sonar arrays are generally built up from separate components at several hull mount sites on a hull. Typically, there are a number of hull mount sites that are aligned along the starboard side of the hull and an equal number of hull mount sites aligned along the port side of the hull. Each hull mount site includes a baffle, a signal conditioning plate (also referred to as an SCP), a vibration isolation module (also referred to as a VIM), an array of sensors, and an outer decoupler (also referred to as an ODC). As mentioned, each of these separate components is placed on the hull one after the other. The building process is time consuming as it takes time to build up each site. In addition, many of the separate components are bulky and heavy.

The signal conditioning plate is attached to the baffle. The signal conditioning plate bounces incoming signals back towards the wet-side to the mounted sensors to produce a reflection gain at the sensors in the array. The signal conditioning plate is made of materials so that it can be tuned to produce gain in the frequency of interest.

In order to provide signal enhancement of the incident signals, baffles have been developed to improve the signal-to-noise ratio on hull mounted sonar arrays. Baffles tend to prevent hull noise. Also, in order to achieve this desired result, outside decouplers in the past have been designed to perform two functions, namely: (1) to provide, in conjunction with a signal conditioning plate, the proper impedance backing for one or more hydrophones included in the array; and (2) to isolate or decouple flow noise from the incident signals which tends to undesirably degrade the overall performance of the system.

With regard to the first function, an ideal signal conditioning device is one which when placed directly behind the hydrophones operates to enhance the signal response at all frequencies without introducing phase shifts. In known prior art apparatus, thick steel plates having pressure release, i.e. low impedance, backings have been used to approach this end. However, as the need for improved performance requires the use of lower and lower operating frequencies, the thicknesses and weight requirements for the steel plate structures have become prohibitive from a practical standpoint.

The vibration isolation module is attached to the signal conditioning plate. The vibration isolation module provides attachment points for the array of sonar sensors that decouple the array from the normal hull vibrations. The vibration isolation module main purpose is to substantially prevent or lessen unwanted noise from vibrations of the hull from reaching the sensors.

Hull-mounted acoustic array panels typically require a sensor module architecture customized for the host platform in question. Existing hull-mounted acoustic array panels use either pressure sensors or accelerometers, along with a baffle/SCP tuned to that particular element. The customization required adds to the cost of the acoustic array panels.

Hull-mounted acoustic array panels typically mount a sensor module onto the Signal Conditioner Plate (SCP). The electronics associated with the sensor (amplifiers etc.) typically reside in an off-board "bottle" which lies to the side, or on top of, these modules. In order to form a continuous array of sensors, this architecture dictates either two rows of column-based stave modules, or two columns of row-based ones. This basically means that each platform requires a separate set of custom stave modules to span the desired acoustic aperture. In addition, the staves of sensors are wired so that if one sensor fails, the remaining sensors in the stave also fail.

In many instances, the individual sensors are made from solid ceramic plates or solid ceramic blocks and so are also heavy. Heavy sensors result in a heavy array of sensors. The heavy arrays add to the weight to the assembly needed for a hull mounted array. The staves are also wired together and with signals being carried out to rails on the side of the sensor array. The stave architecture is also somewhat inflexible. Each set of staves is custom designed for each platform on which the sensors are placed. When attaching staves of sensors to other platforms, a new custom design is made specific to the platform.

As mentioned previously, the current panels are heavy. The baffle that forms part of the acoustic array panel is one of the heavier portions of the panel. The individual sensors include a solid ceramic plate or solid ceramic blocks and add to the weight of the panel.

In ship building, it is a constant goal to make the vessel lighter. Another goal is to make components more reliable. Still a further goal includes making the components easier to install.

In addition, all sonar, radar, and optics systems receive waveforms from turbulent diffracting and refracting environments. Not all portions of a wavefront pass through the medium of propagation with identical results because all real-world mediums are not homogeneous. The small differences in ray path characteristics have the tendency to distort the wavefront (i.e. make it non-spherical). In current systems, distortions in the wavefront are corrected after the sound wave has passed the sensors, such as an acoustic sensor in a SONAR system. In such a device, electronics are used to correct for distortion of the wavefront after it has passed. In other words, the electronics are always playing catch-up because the signal conditioning performed to correct for distortion is done after a wave has already passed. In such a system an assumption must be made that may not necessarily be true. The assumption is that the random variations in distortion are not independent events and, therefore, vary slowly compared to the time it takes to adjust the sensor. This is probably not a terrible assumption, but an imperfect assumption, nonetheless.

DETAILED DESCRIPTION

Figure 1:
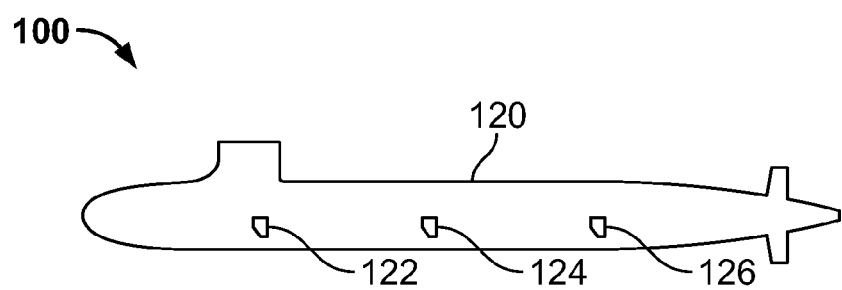
FIG. 1 is a side view of a vessel including an array of sonar sensors having a laser projected acoustic sensor apparatus, according to an example embodiment.

FIG. 1 is a side view of a vessel 100 including an array of sonar sensors 120 having a laser projected acoustic sensor apparatus 300, according to an example embodiment. The vessel 100 is a submarine. It should be understood that other types of vessels may also include an array of sonar sensors with a laser projected acoustic sensor apparatus 300. The array of sonar sensors 120 includes a number of subarrays of sonar sensors that are added to other components to form a panel, such as panels 122, 124, 126. The vessel's 100 port side is shown with three panels 122, 124, 126 that include sonar sensors. The sonar sensors can be acoustic sensors. The panels 122, 124, 126 are positioned along the port side of the vessel 100. The starboard side of the vessel 100 also includes three similarly positioned panels (not shown) of sonar sensors. In total, there are six panels on the vessel that form the array 120. It should be noted that other arrays can have a different number of panels. Some vessels 100 may include more panels and some vessels may include fewer panels to form an array of sensors. Associated with the array is at least one laser projected acoustic sensor apparatus 200. In one embodiment, each panel includes a separate laser projected acoustic sensor apparatus 200. In another embodiment, the laser projected acoustic sensor apparatus 200 is used for a plurality of the panels 122, 124, 126 of the sensor array and the other panels (not shown) of the sensor array.

The panel 122 is described as one example of the panels of the vessel. The remaining panels are substantially similar so only the example panel 122 will be described. The panel 122 includes a baffle, and a signal conditioning plate ("SCP"). A vibration isolation mount ("VIM") is used to mount the panel 122 to the hull of the vessel 100. The signal conditioning plate prevents or substantially lessens noise from water. The signal conditioning plate also enhances the signal input to an acoustic sensor. The vibration isolation mount substantially isolates or substantially lessens noise from the vibration of the hull of the vessel from reaching the acoustic sensor.

Figure 2:
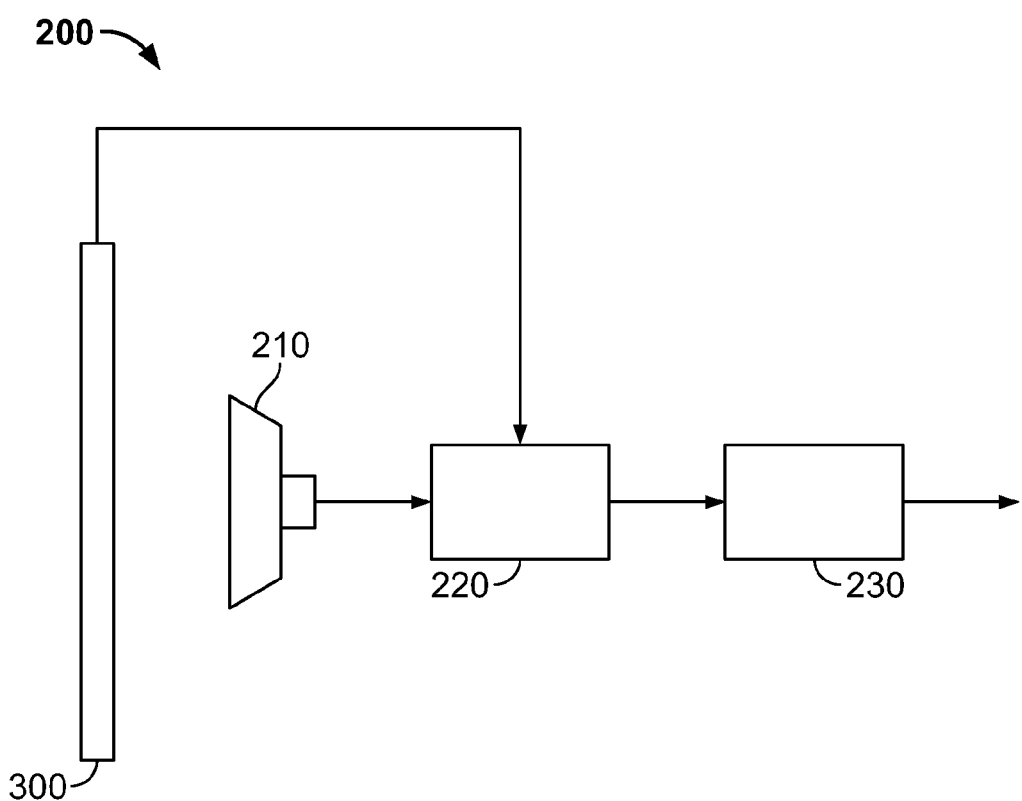
FIG. 2 is a schematic diagram of a signal processing apparatus used to process signals generated by the transducers of the sensor array, according to an example embodiment.

FIG. 2 is a schematic diagram of a signal processing apparatus 200 used to process signals generated by the transducers of the sensor array 120, according to an example embodiment. The signal processing apparatus 200 includes the laser projected acoustic sensor apparatus 300, a transducer for receiving the signal 210, a precompensation module 220, and a signal processing apparatus 230. The laser projected acoustic sensor apparatus 300 detects distortion in the wave received before the wave is received at the transducer 210. The laser projected acoustic sensor apparatus 300 can be used to determine the distortion relative to other portions of the wave. The precompensation module 220 receives input from the laser projected acoustic sensor apparatus 300, determines the phase differences associated with the wave producing the signal and adds the phase differences to the signal to produce a substantially undistorted wave. The precompensation module 220, in one embodiment, is a combination of hardware and software. In other embodiments, the precompensation module 220 can be hardware, and, in yet another embodiment the precompensation module 220 is substantially all software. Software is a set of instructions executed on a processor of a computer having at least a processor and memory. The software can control other portions of a computer or other machines under the control of the processor.

Figure 3:
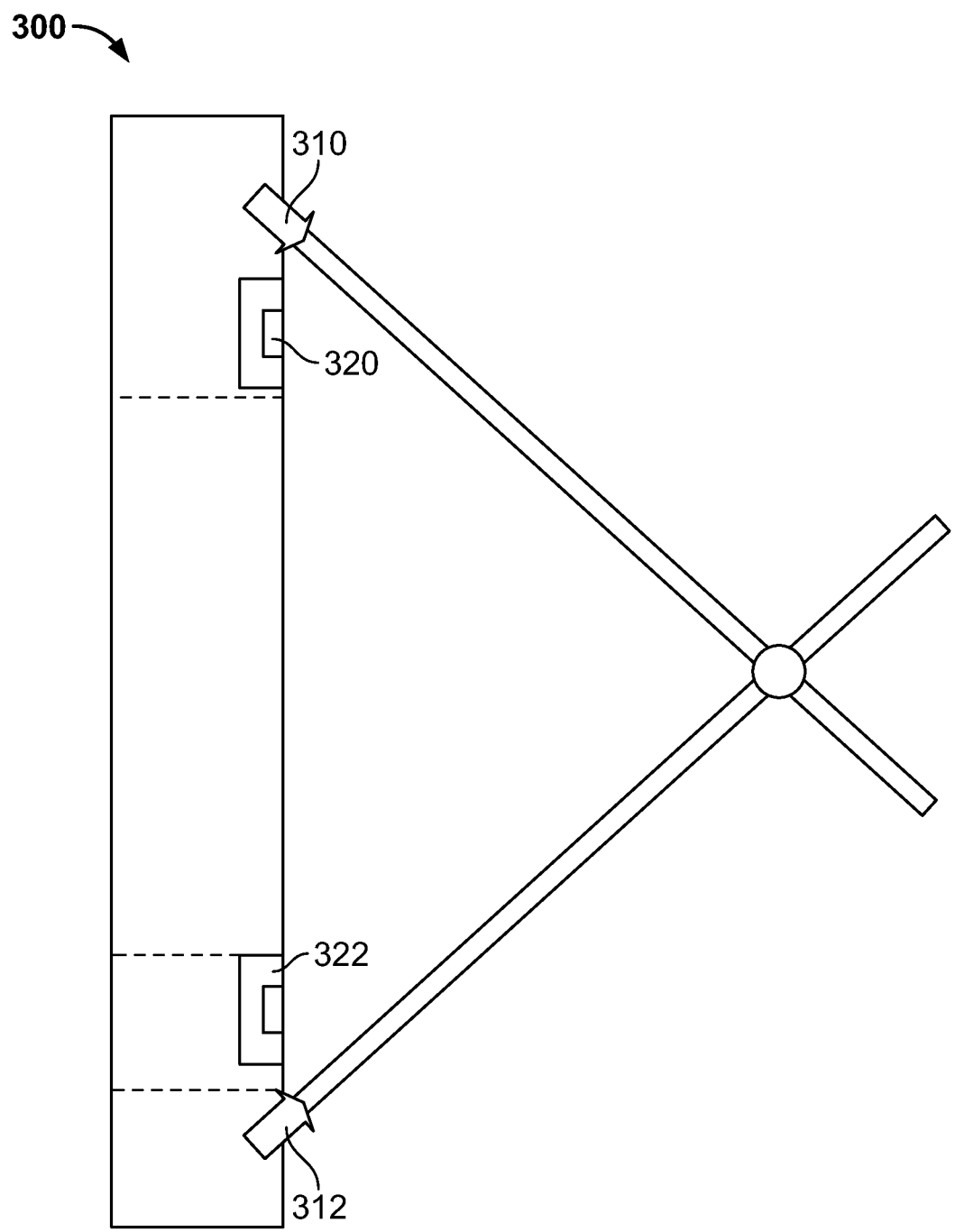
FIG. 3 is a schematic view of the laser projected acoustic sensor apparatus, according to an example embodiment.
Figure 4:
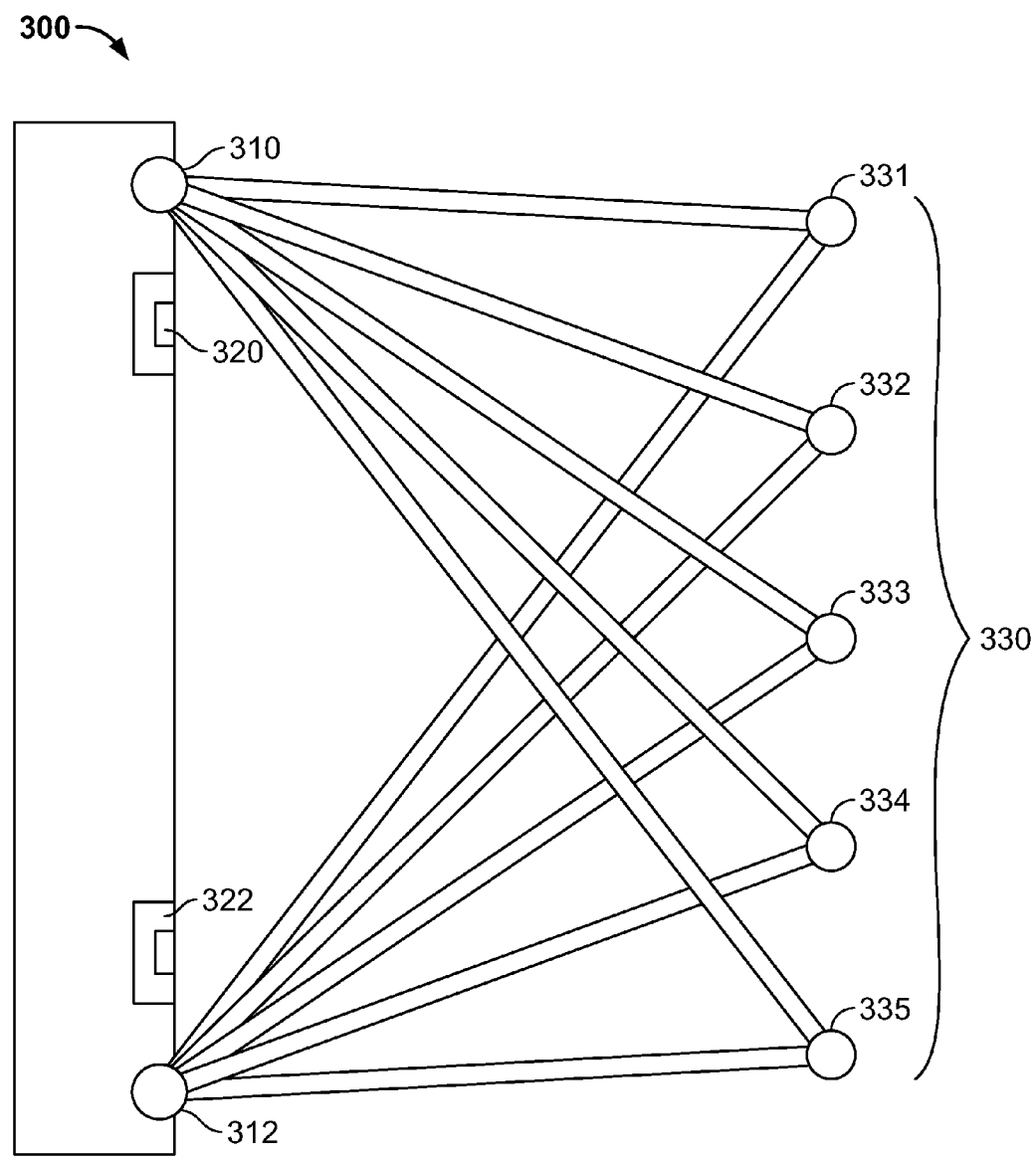
FIG. 4 is a schematic view of the laser projected acoustic sensor apparatus when producing a lattice or array of points, according to an example embodiment.

FIG. 3 is a schematic view of the laser projected acoustic sensor apparatus 300, according to an example embodiment. FIG. 4 is a schematic view of the laser projected acoustic sensor apparatus 300 when producing a lattice or array of points, according to an example embodiment. The apparatus 300 is substantially the same in both FIGS. 3 and 4. The laser projected acoustic sensor apparatus 300 will now be described in more detail referring to both FIGS. 3 and 4. The laser projected acoustic sensor apparatus 300 includes a first laser 310 and a second laser 312 and a first optical sensor 320 and a second optical sensor 322. The frequencies of the lasers 310, 312 are frequencies selected for their seawater scattering properties. The lasers 310, 312 are directed so that the collimated light from the lasers 310, 312 intersect. At the intersection points of the lasers 310, 312, the lasers form a visible point, such as point 314 in FIG. 3. In FIG. 4 the laser 310 is split into a plurality of beams and laser 312 is also split into a plurality of beams. The intersection of the plurality of beams from laser 310 and the plurality of beams from laser 312 forms a projected sensing array 300 of points 331, 332, 333, 334, 335. The array 300 is composed of anomalously bright and large points of light 331, 332, 333, 334, 335 in the water where the lasers 310, 312 constructively interfere (fringe field effects make these points slightly larger than the beam; brighter compared to a single beam). Optical tracking of these points 331, 332, 333, 334, 335 enables acoustic sensing of the shape of the acoustic wave as it passes the points 331, 332, 333, 334, 335. It should be noted that the array of points can be one dimensional, two dimensional or three dimensional. FIG. 3 shows a single point. FIG. 4 shows a linear, one dimensional array 300. In one embodiment, the lasers 310, 312 sweep and are pulsed to produce the various beams that interfere and form the projected points 331, 332, 333, 334, 335 of the array 300. In another embodiment, the lasers 310, 312 are pulsed lasers which are acoustic-optically steered.

Figure 5:
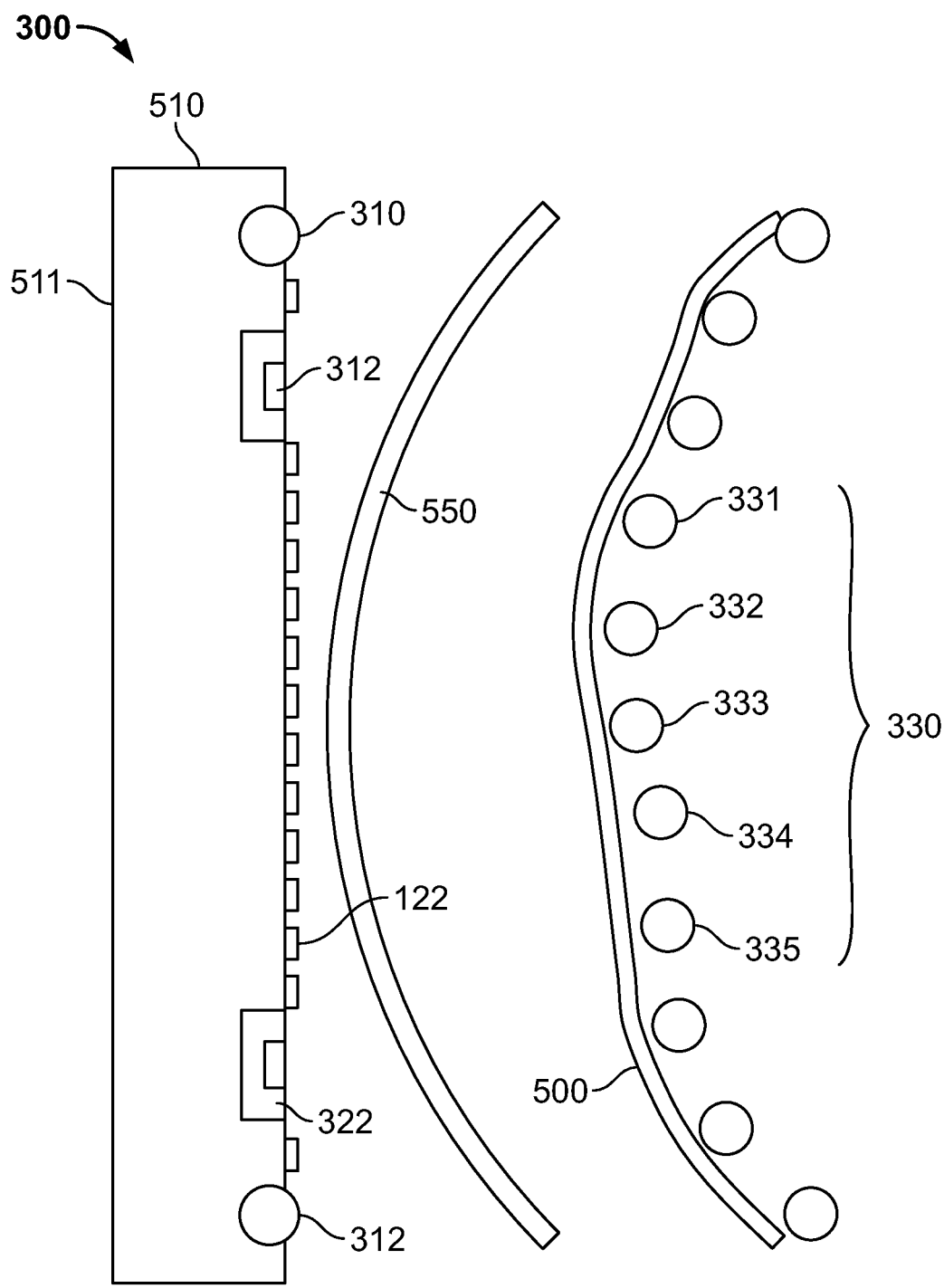
FIG. 5 is a schematic view of the laser projected acoustic sensor apparatus attached to a hull of a vessel as it receives a distorted wave, according to an example embodiment.

FIG. 5 is a schematic view of the laser projected acoustic sensor apparatus 300, attached to a hull 510 of a vessel 511 as it receives a distorted wave 500, according to an example embodiment. As shown in FIG. 5, the laser projected acoustic sensor apparatus 300 is attached near an array 120 of sonar sensors, such as acoustic sensors associated with a subarray, such as subarray 122, 124, or 126. The laser projected acoustic sensor apparatus 300 includes a first laser 310, a second laser 312, a first optical sensor 320, and a second optical sensor 322. As shown in FIG. 5, the wave 500 is distorted or non-spherical since the medium, in this case ocean water, is not homogeneous. The non-homogenous nature of the medium produces small differences in ray path characteristics which have a tendency to distort the wave 500, and more specifically the wavefront associated with the wave 500. As shown in FIG. 5, the array 330 of intersection points such as 331, 332, 333, 334, 335 are positioned away from the hull 510 well in front of the array 120 of acoustic sensors. Put another way, the pulsed lasers which are acoustically steered form a projected holographic array in front of the hull mounted array of sensors. The optical sensors 320, 322 detect the distortion of incoming acoustic wave 500. The distortion of the incoming acoustic wavefront 500 can then be input to the precompensation module 200 which calculates phase correction factors to apply to the signals associated with the distorted wave 500. The phase correction factors applied to the wave convert the distorted wave 500 to a substantially non-distorted wave 550 shown in FIG. 5. The phase correction factors are applied to the signals associated with the various sensors of the sensor array 120 so that the distorted wave is converted to a non-distorted wave prior to applying further signal processing. The phase correction factors and the application of them to the received signals is done in the precompensation module 220 (shown in FIG. 2). Since the incoming wave is corrected for distortion, greater accuracy in target range and angle estimation is achieved. This is very true for submarines.

Put another way, the lasers, such as lasers 310, 312, are positioned and angled so that, at predetermined distances/locations away from the hull, the beams intersect and constructively interfere. There are some fringe patterns around the points of intersection, but these effects are not likely to create any issues and might be beneficial to the application. The laser frequency is chosen so that the beam undergoes scattering in sea water from water-borne particulates. This allows the beam to be visible in the water. At the points of multi-beam intersection, the constructive interference from multiple beams creates an anomaly of bright light along the path of each beam present at that particular intersection. Along a hull of a ship, a sufficient number of lasers is employed to create a lattice of these intersectional points. The lattice can be 1D, 2D or 3D. Using optical sensors, such as sensors 320, 322 distributed across the submarine hull, the system 330 would image these projected point sources of light and track their movement in three dimensions. As wavefronts pass through the lattice of projected points, it will deform in such a way that the sensor system can then, by tracking the motion of the projected point sources, determine the shape of the inbound acoustic signal. The wavefront shape can then be used to determine the phase adjustments necessary for the acoustic sensors which are about to receive the signal. The effect is the acoustic sensors can better 'focus' on the signal and gain improved range and angle measurement accuracy. In addition, the signal processing applied at the signal processing module 230 is simplified so as to speed the signal processing. Adding the phase corrections up front essentially transforms the incoming wave to a substantially non-deformed state. The signal processing is simplified since the signal processing module 230 does not have to also correct for phase differences along the wavefront.

The laser projected acoustic sensor apparatus 300 technology can be used to produce several other possible solutions. For example, the acoustic sensor could be replaced by the laser projected acoustic sensor apparatus 300. The result would be a lightweight sensor platform. The laser projected acoustic sensor apparatus 300 could be made with two acousto optically or fast-mirror steered lasers and a few optical sensors/cameras. The laser projected array could replace a full array of piezoelectric ceramic transducers.

Another possible solution is that remote acoustic signal sensing could be used to produce cloaking signals. Using inputs from acoustic projection and sensing, signal processing devices can produce active out of phase acoustic waves that would cancel or substantially cancel the incoming waves before they hit the vessel. This would result in cloaking of the submarine or other vessel by producing out of phase cancelling signals. In other words, being able to detect sound before it makes contact with the vessel makes active out-of-phase acoustic cloaking realizable.

Figure 6:
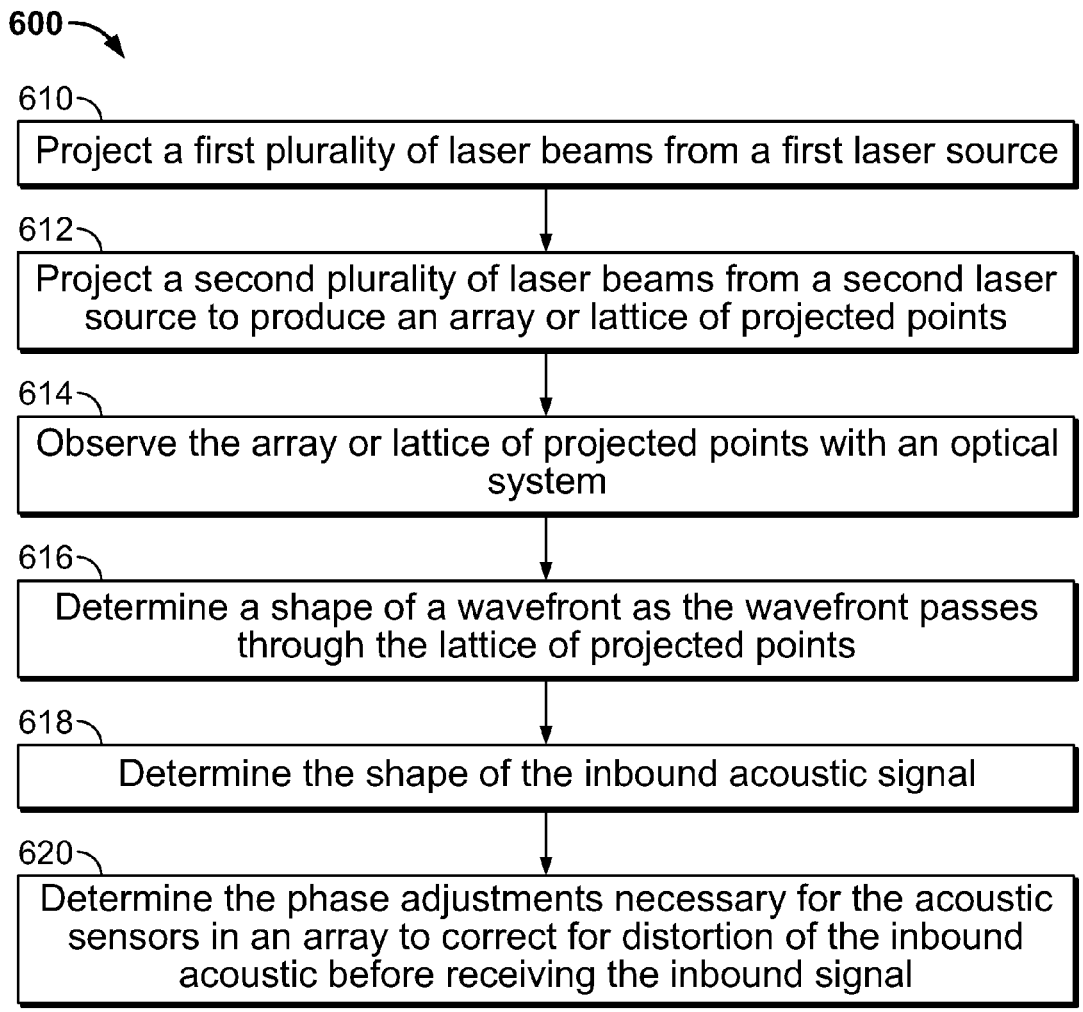
FIG. 6 is a flow diagram of a method of detecting an incoming wave front, according to an embodiment.

FIG. 6 is a flow diagram of a method 600 of detecting an incoming wave front, according to an embodiment. The method 600 includes projecting a first plurality of laser beams from a first laser source 610, and projecting a second plurality of laser beams from a second laser source 612, the first plurality of laser beams intersecting the second plurality of laser beams and forming an array or lattice of projected points. Observing the array or lattice of projected points with an optical system 614, and determining a shape of a wavefront as the wavefront passes through the lattice of projected points 616. The lattice or array of projected points will deform in such a way that the optical sensor system can then, by tracking the motion of the projected point sources, determine the shape of the inbound acoustic signal 618. The wavefront shape can then be used to determine the phase adjustments necessary for the acoustic sensors which are about to receive the signal 620.

It should be noted that the precompensation module 220 and the signal processing module 230 can include a computer hardware portion and a computer software portion. In some embodiments, the precompensation module 220, and the signal processing module 230 can be formed from only hardware. In other embodiments, the precompensation module 220, and the signal processing module 230 can be formed from only software. It should be noted that each of the precompensation module 220, and the signal processing module 230, may have software components and when the software is executed on a generalized computer, the generalized computer becomes a specialized machine. It should also be noted that the method discussed above with respect to FIG. 6 can be a computerized method.

In one example embodiment, lasers are arranged on the outer hull of a submarine so as to project coherent light out from the outer hull of the submarine. These lasers are positioned and angled so that, at predetermined distances/locations away from the hull, the beams intersect and constructively interfere. There would be some fringe patterns around the points of intersection, but these effects are not likely to create any issues and might be beneficial to the application. The laser frequency is chosen so that the beam undergoes scattering in sea water, from water-borne particulates in the seawater. This allows the beam to be visible in the water, at least for some small distance beyond which the intensity is too weak to detect. The laser beams' visible intensity would fall off as range increases so it would appear to fade as it goes into the distance. At the points of multi-beam intersection the constructive interference from multiple beams would create an anomaly of bright light along the path of each beam present at that particular intersection. A sufficient number of lasers is employed to create a multi-dimensional lattice of these intersectional points. The lattice can be a 1D, 2D or a 3D lattice. As mentioned above, optical sensors are distributed across the submarine hull. The optical sensors distributed across the submarine hull the system image the projected point sources of light that makes up the lattice, and tracks their movement in three dimensions. As one or more wavefronts pass through the lattice they deform the lattice, or more specifically, the points in the lattice. The deformation occurs in such a way that the sensor system can track the motion of the projected point sources and determine the shape of the inbound acoustic signal. The wavefront shape can then be used to determine the phase adjustments necessary for the acoustic sensors which are about to receive the signal. The phase adjustments are applied to remove or substantially remove deformations in the wavefront when it is received. The effect is the acoustic sensors can better focus on the signal and gain improved range and angle measurement accuracy.

This example embodiment allows the detection of wavefront shape before the wave arrives. Correction factors could be calculated in advance ensuring the optimal correction is applied at any given moment.

Figure 7:
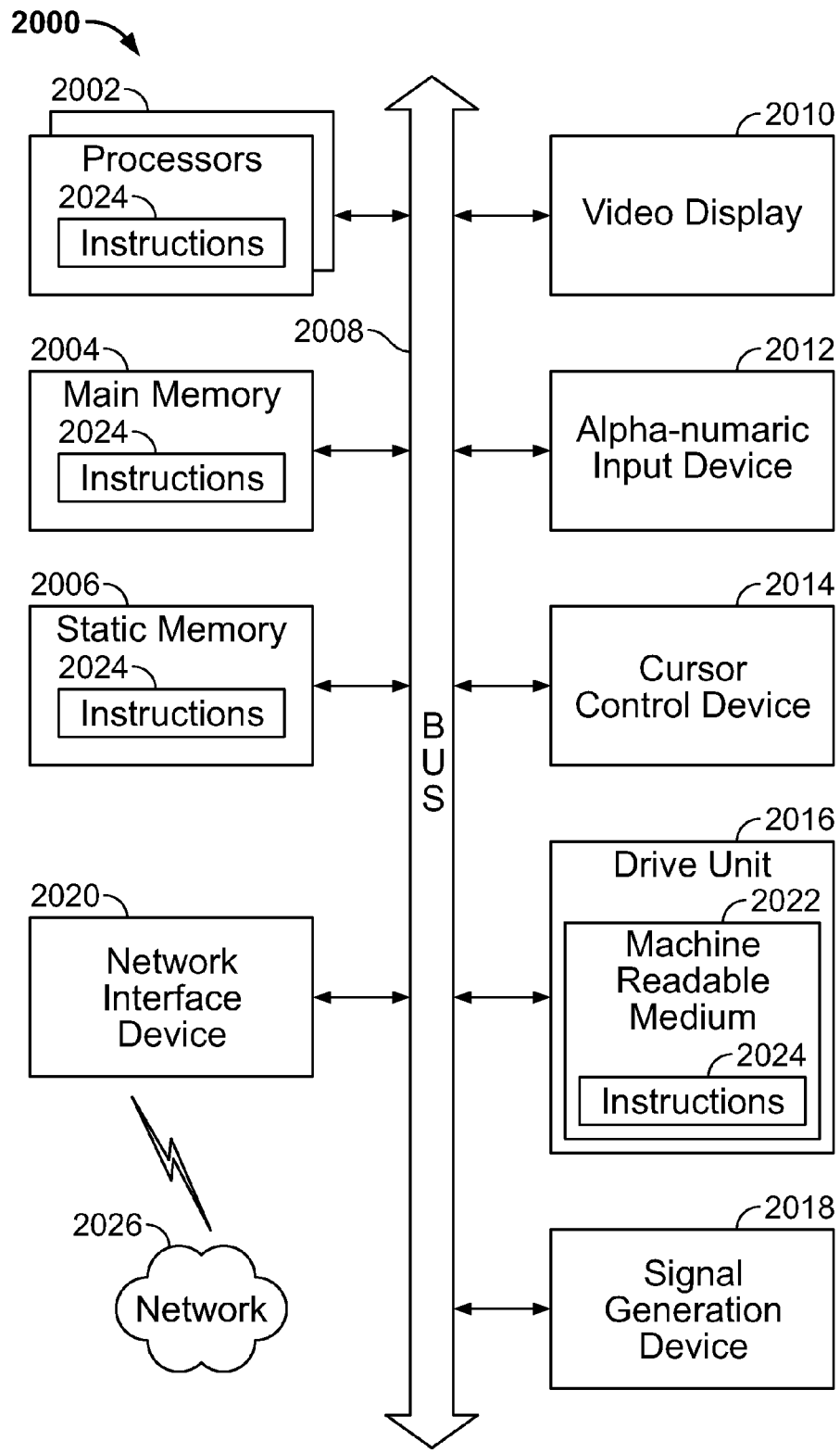
FIG. 7 shows a diagrammatic representation of a computer system, within which a set of instructions for causing the machine to perform any one or more of the phase correction methodologies discussed herein can be executed or is adapted to include the apparatus for phase correction, according to an example embodiment.

FIG. 7 shows a diagrammatic representation of a computer system 2000, within which a set of instructions for causing the machine to perform any one or more of the phase correction methodologies discussed herein can be executed or is adapted to include the apparatus for phase correction as described herein. In various example embodiments, the machine operates as a standalone device or can be connected (e.g., networked) to other machines. In a networked deployment, the machine can operate in the capacity of a server or a client machine in a server-client network environment, or as a peer machine in a peer-to-peer (or distributed) network environment. The machine can be a personal computer (PC), a tablet PC, a set-top box (STB), a Personal Digital Assistant (PDA), a cellular telephone, a portable music player (e.g., a portable hard drive audio device such as a Moving Picture Experts Group Audio Layer 3 (MP3) player, a web appliance, a network router, a switch, a bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 2000 includes a processor or multiple processors 2002 (e.g., a central processing unit (CPU), a graphics processing unit (GPU), arithmetic logic unit or all), and a main memory 2004 and a static memory 2006, which communicate with each other via a bus 2008. The computer system 2000 can further include a video display unit 2010 (e.g., a liquid crystal displays (LCD) or a cathode ray tube (CRT)). The computer system 2000 also includes an alphanumeric input device 2012 (e.g., a keyboard), a cursor control device 2014 (e.g., a mouse), a disk drive unit 2016, a signal generation device 2018 (e.g., a speaker) and a network interface device 2020.

The disk drive unit 2016 includes a computer-readable medium 2022 on which is stored one or more sets of instructions and data structures (e.g., instructions 2024) embodying or utilized by any one or more of the methodologies or functions described herein. The instructions 2024 can also reside, completely or at least partially, within the main memory 2004 and/or within the processors 2002 during execution thereof by the computer system 2000. The main memory 2004 and the processors 2002 also constitute machine-readable media.

The instructions 2024 can further be transmitted or received over a network 2026 via the network interface device 2020 utilizing any one of a number of well-known transfer protocols (e.g., Hyper Text Transfer Protocol (HTTP), CAN, Serial, or Modbus).

While the computer-readable medium 2022 is shown in an example embodiment to be a single medium, the term "computer-readable medium" should be taken to include a single medium or multiple media (e.g., a centralized or distributed database, and/or associated caches and servers) that store the one or more sets of instructions and provide the instructions in a computer readable form. The term "computer-readable medium" shall also be taken to include any medium that is capable of storing, encoding, or carrying a set of instructions for execution by the machine and that causes the machine to perform any one or more of the methodologies of the present application, or that is capable of storing, encoding, or carrying data structures utilized by or associated with such a set of instructions. The term "computer-readable medium" shall accordingly be taken to include, but not be limited to, solid-state memories, optical and magnetic media, tangible forms and signals that can be read or sensed by a computer. Such media can also include, without limitation, hard disks, floppy disks, flash memory cards, digital video disks, random access memory (RAMs), read only memory (ROMs), and the like.

Figure 9:
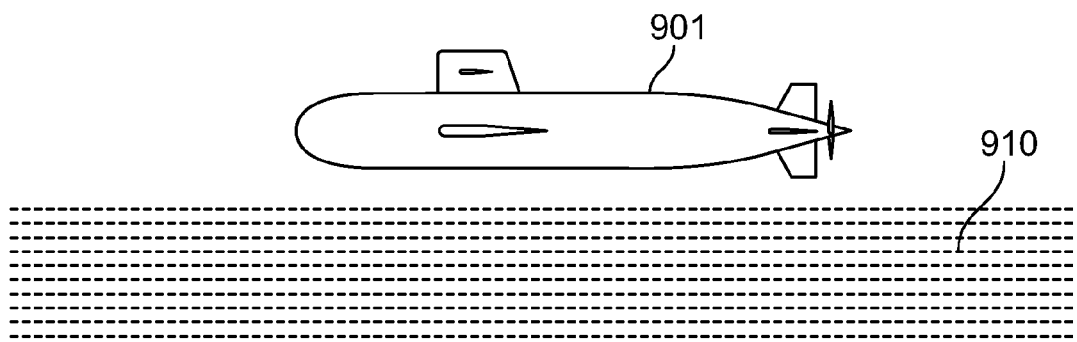
FIG. 9 shows a submarine employing another example embodiment of the invention.

It should be noted that the method discussed with respect to FIG. 9 can be a flow diagram associated with a computerized method, according to an example embodiment. When the computerized method 900, discussed above, is programmed into a memory of a general purpose computer, the computer and instructions form a special purpose machine. The instructions, when programmed into a memory of a general purpose computer, is in the form of a non transitory set of instructions.

The example embodiments described herein can be implemented in an operating environment comprising computer-executable instructions (e.g., software) installed on a computer, in hardware, or in a combination of software and hardware. Modules as used herein can be hardware or hardware including circuitry to execute instructions. The computer-executable instructions can be written in a computer programming language or can be embodied in firmware logic. If written in a programming language conforming to a recognized standard, such instructions can be executed on a variety of hardware platforms and for interfaces to a variety of operating systems. Although not limited thereto, computer software programs for implementing the present method(s) can be written in any number of suitable programming languages such as, for example, Hyper text Markup Language (HTML), Dynamic HTML, Extensible Markup Language (XML), Extensible Stylesheet Language (XSL), Document Style Semantics and Specification Language (DSSSL), Cascading Style Sheets (CSS), Synchronized Multimedia Integration Language (SMIL), Wireless Markup Language (WML), Java™, Jini™, C, C++, Perl, UNIX Shell, Visual Basic or Visual Basic Script, Virtual Reality Markup Language (VRML), ColdFusion™ or other compilers, assemblers, interpreters or other computer languages or platforms.

Figure 8:
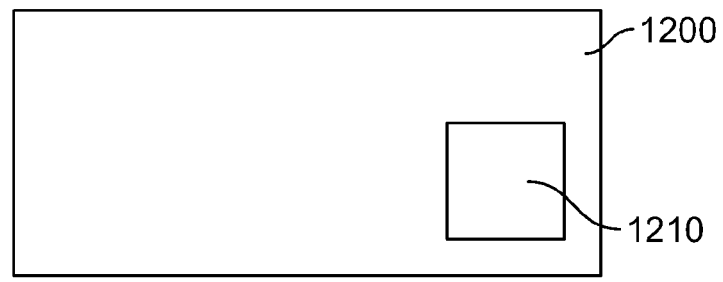
FIG. 8 is a schematic drawing of a machine readable medium that includes an instruction set, according to an example embodiment.

FIG. 8 is a schematic drawing of a machine readable medium 1200 that includes an instruction set 1210, according to an example embodiment. The machine-readable medium 1200 that provides instructions 1210 that, when executed by a machine, cause the machine to perform operations including beamforming a plurality of inputs from the pressure sensors 910 from a plurality of dual sensors 600 together, and beamforming a plurality of inputs from the accelerometers 912 from a plurality of dual sensors 600 together. The instructions 1210 can also use the outputs from beamforming the plurality of pressure sensors and from beamforming the plurality of accelerometers and adaptively combine these outputs to substantially eliminate or substantially reduce the phase noise.

The present disclosure refers to instructions that are received at a memory system. Instructions can include an operational command, e.g., read, write, erase, refresh, etc., an address at which an operational command should be performed, and the data, if any, associated with a command. The instructions can also include error correction data.

FIG. 9 shows a submarine 901 using another example embodiment of the invention. The submarine 901 includes a plurality of intersecting lasers that excite point regions of particulates or substances dissolved in the surrounding seawater, for example, sodium, and the surrounding seawater. This produces flash heating up for the water and creates highly localized micro-thermocline. The point regions of the micro-thermoclines form a lattice 910 of similar points. As shown in FIG. 9, the lattice 910 is located below the submarine 901. Sound waves received in water will move these micro-thermocline points. The submarine 901 and therefore includes one or more rapidly pulsed sensing lasers that track individual micro-thermoclines of water as pressure waves, such as sound waves, move the micro-thermocline. The sensing lasers track substantially all of the micro-thermoclines in the array 910. Based on the movement of sound through the micro-thermoclines, as sensed by the sensing lasers, the sound can be sensed. Additionally, the sensing lasers can detect distortions in the wave front and corrections can be placed to smooth out the wavefront and provide better data for sensing. For example, in one embodiment, an amount of phase error can be detected and added to the signals to correct the wavefront.

Figure 10:
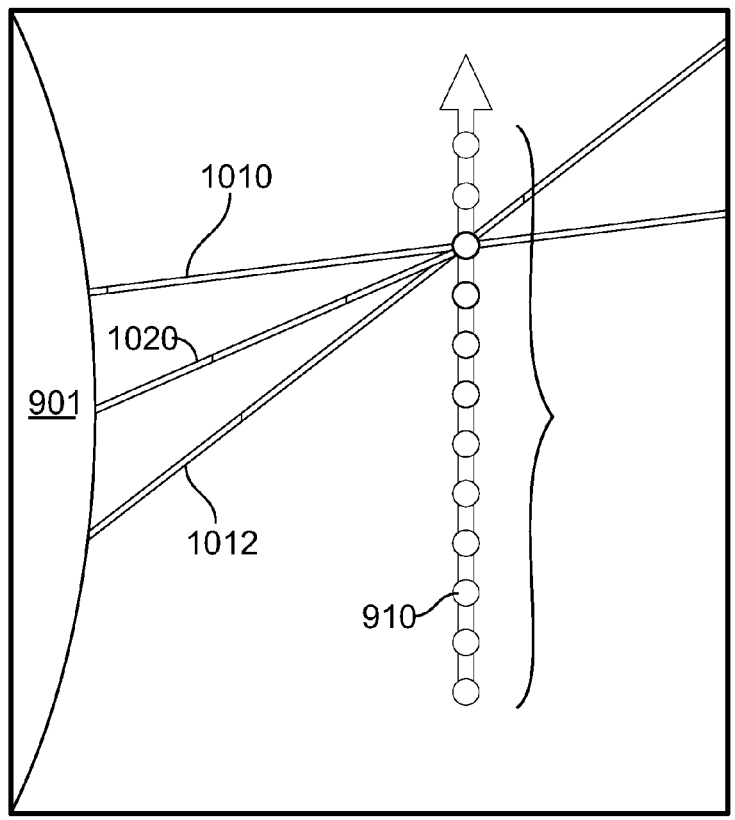
FIG. 10 is a schematic diagram showing a cross-section of the submarine hull, a first excitation laser, a second excitation laser, and a range-finding or sensing laser, according to an example embodiment.

FIG. 10 is a schematic diagram which further details the example embodiment described in FIG. 9. In FIG. 10, the submarine 901 is shown as a cross-section of the submarine hull. Associated or attached to the submarine 901 is a first excitation laser 1010 and a second excitation laser 1012. Also associated or attached to the submarine 901 is a sensing laser 1020. Each of the lasers 1010, 1012, 1020 are fast steering mirror or acousto-optically directed, pulsed lasers. The excitation lasers 1010, 1012 sweep through various angles to produce the matrix of micro-thermoclines 910. The sensing laser 1020 is basically an axis rangefinder and sweeps and notes differences in the range to various points in the lattice 910. It should be understood that in some operations the vessel will be underway. The speed of the vessel can be calculated so as to compensate for range changes resulting from the vessel being in motion.

More specifically the excitation lasers 1010, 1012 have enough power so that when a plurality of these lasers intersect, they will be able to produce enough excitation to flash heat seawater. The flash heating occurs in highly localized regions of seawater. This results in a point in the lattice of micro-thermoclines 910. The individual points in a lattice or matrix of micro-thermoclines is small and results in a small temperature differential between the point and the surrounding seawater. For example, the individual micro-thermocline may have a volume of approximately 1 $mm^3$ and the temperature differential will be in the range of 1 to 10° F. These individual points must be periodically re-made or refreshed as thermal decay will destroy them. As noted above, an individual excitation laser is not powerful enough to excite the water by itself. Instead, multiple lasers are steered to predetermined locations in the water where they intersect and constructively interfere with each other. The summed power of the lasers creates a micro-thermocline environment. The excitation only occurs where the lasers intersect. The lasers use mirrors or acousto-optics to rapidly steer these excitation lasers to a number of intersection points to create a matrix or lattice or an array of micro-thermoclines in the water. The sensing laser 1020 has a different frequency than the excitation lasers 1010, 1012. The sensing laser is directed at each synthetic micro-thermocline. The sensing laser 1020 is also rapidly steered with mirrors or acousto-optics. By watching for backscatter from the sensing laser 1020, and by using basic range-finding techniques, the system locates the micro-thermoclines. The sensing lasers 1020 rapidly pulse and track the motion of the synthetic array elements or individual points in the lattice 910 or array or matrix. These individual points move in the presence of pressure waves, such as sound waves. Thus, sound can be detected without having a hydrophone. The sound is detected by noting the motion of the individual elements or micro-thermoclines or points in the lattice.

It should also be noted that the ocean or sea has naturally occurring thermoclines. Typically sound will not pass through a thermocline in the ocean. Therefore it is contemplated that a submarine could hide below a naturally occurring thermocline. Meanwhile, the submarine could listen to activity above the thermocline by producing a lattice or matrix of micro-thermoclines that occur either at the natural thermocline or slightly above it. In other words, the matrix or lattice of micro-thermoclines 910 is not limited to a position below the submarine 901 or to the sides of the submarine 901 but can also be used or produced above, in front or even behind the submarine 901.

It should also be noted that because the matrix or lattice or array of micro-thermoclines is created in an ad-hoc manner; each point is created as needed; that the array can change shape, size and/or orientation while the vessel is underway. For example: when a sound signal of interest is identified the submarine 901 can re-orient the sensing array of micro-thermoclines so that the boresight angle, the normal vector to the array's spatial plane, is pointed at the signal of interest. Thus the scan loss all physical arrays experience when looking away from the center angle, boresight, is eliminated.

Figure 11:
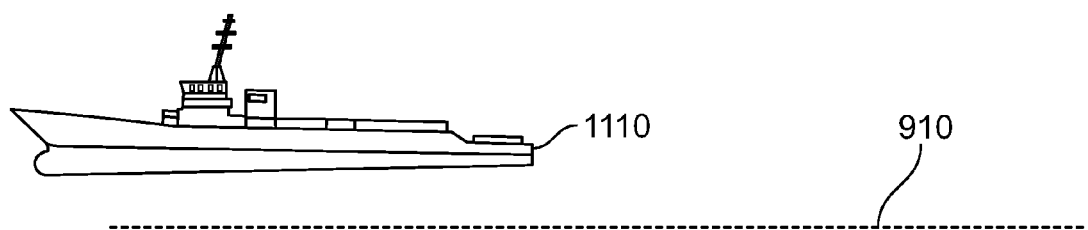
FIG. 11 shows a schematic diagram of a surface vessel employing an embodiment of the invention.

FIG. 11 shows a schematic diagram of a surface vessel 1100 using an embodiment of the invention. The surface vessel 1110 can also be provided with excitation lasers and sensing lasers that can be used to produce an array or matrix or lattice of micro-thermoclines. Thus, use of the invention is not limited to submarines. Is further contemplated that other types of vessels could also use variations of this invention. For example, one possible use would be in oil exploration. In the past, arrays of hydrophones are pulled behind a ship. Sound is directed to the sea floor and the reflections of the sound are used to determine possible locations of oil, natural gas, and other minerals below the floor of the ocean. The above arrangement could be used along with signal processing equipment to correct for any deformations or distortion in received wavefronts received at the lattice or array of micro-thermoclines. More accurate readings would enable geologists to more accurately detect and find oil, natural gas and the like. There would also be zero drag on the vessel and no problems when the vessel is turned where lengths of towed hydrophones may become tangled, change shape, and the like.

This has been a detailed description of some exemplary embodiments of the invention(s) contained within the disclosed subject matter. Such invention(s) may be referred to, individually and/or collectively, herein by the term "invention" merely for convenience and without intending to limit the scope of this application to any single invention or inventive concept if more than one is in fact disclosed. The detailed description refers to the accompanying drawings that form a part hereof and which shows by way of illustration, but not of limitation, some specific embodiments of the invention, including a preferred embodiment. These embodiments are described in sufficient detail to enable those of ordinary skill in the art to understand and implement the inventive subject matter. Other embodiments may be utilized and changes may be made without departing from the scope of the inventive subject matter. Thus, although specific embodiments have been illustrated and described herein, any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed:

1. A waveform detection apparatus comprising:
   a first source of laser light;
   a second source of laser light, the first source of laser light and the second source of laser light positioned to constructively interfere with one another to form a lattice of visible bright spots which are brighter than a single laser beam;
   an array of optical sensors monitoring the lattice of bright spot, the bright spots movable in response to a passing sound wave front; and
   a phase change detector for detecting phase changes in the passing sound wave front from inputs from the optical sensors monitoring the array of visible bright spots.

2. The waveform detection apparatus of claim 1 wherein at least one of the first source of laser light and the second source of laser light are pulsed lasers that sweep to form a plurality of laser beams emanating from the source.

3. The waveform detection apparatus of claim 1 wherein at least one of the first source of laser light and the second source of laser light sweep to form a plurality of laser beams emanating from the source.

4. The waveform detection apparatus of claim 1 wherein the first source of laser light and the second source of laser light are acoustic-optically steered pulsed lasers.

5. The waveform detection apparatus of claim 1 wherein the first source of laser light and the second source of laser light operate at a laser frequency chosen so that the laser beams undergo scattering in sea water.

6. The waveform detection apparatus of claim 1 wherein the lattice formed by the first source of laser light and the second source of laser light is two dimensional.

7. The waveform detection apparatus of claim 1 wherein the lattice formed by the first source of laser light and the second source of laser light is three dimensional.

8. The waveform detection apparatus of claim 1 further comprising a phase correction apparatus for correcting phase differences detected by the optical sensors.

9. The waveform detection apparatus of claim 1 wherein the array of optical sensors are mounted onto a hull of a vessel.

10. The waveform detection apparatus of claim 1 wherein the lattice of bright spots is a holographic array.

11. The waveform detection apparatus of claim 1 further comprising a precompensation module that receives detected phase changes from the phase change detector and calculates phase correction factors to apply to signals associated with the passing sound wave front to convert a distorted passing sound wave front to a substantially non-distorted sound wave front.

12. A method for signal processing comprising:
    producing a lattice of points from constructive interference of laser light from a first laser and a second laser;
    optically sensing distortion in the shape of a passing sound wave front based upon movement of the lattice of points produced from the first laser and the second laser in response to the passing sound wave front;
    detecting the shape of the passing sound wave front from the detected distortion; and
    determining at least one correction factor using the detected shape of the passing sound wave front for removing the detected distortion.

13. The method for signal processing of claim 12 wherein the correction factor is a phase difference between one portion of the passing sound wave front and another portion of the passing sound wave front.

14. The method for signal processing of claim 12 wherein the correction factor is applied to correct distortions in the passing sound wave front.

15. The method for signal processing of claim 12 wherein the correction factor is applied to the passing sound wave front as it is received.

16. The method for signal processing of claim 12 wherein the correction factor is applied to a signal representing the passing sound wave front.

17. The method for signal processing of claim 12 wherein the correction factor is applied to a signal representing the passing sound wave front as it is received.

18. The method for signal processing of claim 12 wherein producing a lattice of points includes selecting a laser frequency for the first laser and the second laser where the laser beams undergo scattering in sea water.

19. The method for signal processing of claim 12 wherein optically sensing distortion includes attaching an array of optical sensors to a surface of a vessel.

20. A waveform detection apparatus comprising:
    a first source of laser light;
    a second source of laser light, the first source of laser light and the second source of laser light positioned to constructively interfere with one another to form a lattice of spots at points of constructive interference between the first source of laser light and the second source of laser light;

a sensor for monitoring spots to detect motion of at least one spot of the lattice of spots, the at least one spot is movable in response to a passing sound wave front; and detecting the shape of the passing sound wave front from the detected movement of the at least one spot.

21. The waveform detection apparatus of claim 20 wherein the sensor is a range-finding laser that monitors spots in the lattice, the range-finding laser having a frequency which is different than the frequency of the first source of laser light and the second source of laser light.

22. A waveform detection apparatus comprising:

a first source of laser light;

a second source of laser light, the first source of laser light and the second source of laser light positioned to constructively interfere with one another to form a lattice of spots at points of constructive interference between the first source of laser light and the second source of laser light; and a sensor for monitoring spots to detect motion of the spot, the first source of laser light and the second source of laser light produce a micro-thermocline at least one of the points of intersection.

* * * * *